US010282857B1

(12) United States Patent
Brailovskiy et al.

(10) Patent No.: US 10,282,857 B1
(45) Date of Patent: May 7, 2019

(54) SELF-VALIDATING STRUCTURED LIGHT DEPTH SENSOR SYSTEM

(71) Applicant: Amazon Technologies, Inc., Seattle, WA (US)

(72) Inventors: Ilya Vladimirovich Brailovskiy, Mountain View, CA (US); Amit Kumar Agrawal, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 143 days.

(21) Appl. No.: 15/634,772

(22) Filed: Jun. 27, 2017

(51) Int. Cl.
H04N 13/02 (2006.01)
G06T 7/521 (2017.01)
H04N 5/33 (2006.01)
H04N 13/254 (2018.01)
H04N 13/271 (2018.01)

(52) U.S. Cl.
CPC ............... G06T 7/521 (2017.01); H04N 5/33 (2013.01); H04N 13/254 (2018.05); H04N 13/271 (2018.05); G06T 2207/10028 (2013.01); G06T 2207/10048 (2013.01)

(58) Field of Classification Search
None
See application file for complete search history.

(56) References Cited

U.S. PATENT DOCUMENTS

| 8,811,767 | B2 | 8/2014 | Veeraraghavan et al. |
| 9,325,966 | B2 | 4/2016 | Tin |
| 2012/0056982 | A1 | 3/2012 | Katz et al. |
| 2014/0240492 | A1 | 8/2014 | Lee |

OTHER PUBLICATIONS

Gupta et al.; Structured Light 3D Scanning in the Presence of Global Illumination; pp. 713-720; 2011.
Zanuttigh et al.; Time-of-Flight and Structured Light Depth Cameras; 2016; pp. 43-79; Springer International Publishing; Switzerland.

Primary Examiner — Tat C Chio
Assistant Examiner — Fabio S Lima
(74) Attorney, Agent, or Firm — K&L Gates LLP

(57) ABSTRACT

Devices and techniques are described for validation of depth data. A first pattern and second pattern may be projected. A first image of the first pattern and a second image of the second pattern may be captured. A first code word may be determined for a first pixel address based on a first value of the first pixel address in the first pattern and a second value of the first pixel address in the second pattern. A third pattern may be projected. A second code word may be determined for the first pixel address based on a third value of the first pixel address in the third pattern and the second value of the first pixel address in the second pattern. A confidence value of the first pixel address may be assigned based on the first code word and the second code word corresponding to the same projector column.

20 Claims, 7 Drawing Sheets

SELF-VALIDATING STRUCTURED LIGHT DEPTH SENSOR SYSTEM

BACKGROUND

Depth sensing cameras may be used to create a three dimensional "depth map" of an environment. Each pixel in a three dimensional depth map may comprise a depth value representing a distance between the depth sensing camera and the portion of the environment represented by the particular pixel. In order to generate a depth map, structured light depth sensors may comprise an infrared projector effective to project patterns of infrared (IR) light into the environment. The reflections of the projected patterns of infrared light may be detected by an infrared image sensor. The pattern of infrared light emitted by the infrared projector and the pattern of reflected infrared light detected by the infrared image sensor can be compared to determine distortions between the emitted and detected patterns. These distortions can be used to generate a depth map of the environment.

DETAILED DESCRIPTION

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Various examples described herein are directed to systems and methods for processing image content. In accordance with embodiments of the present invention, a structured light system can be used to generate estimated depth values and to validate estimated depth values using multiple images taken of different patterns of structured infrared light projected onto the environment. If the same depth values are estimated for a pixel using multiple images taken of different structured light patterns, a high confidence can be assigned to the depth estimation for that pixel. For those pixels where the confidence is low, additional patterns may be projected and used to make additional depth estimations. In various examples, a confidence value of an estimated depth value for a particular pixel may be assigned based on the various validation techniques described herein. The confidence value may be compared to a confidence value threshold. If the confidence value is above the confidence value threshold, the estimated depth value of the pixel may be determined to be within an acceptable level of accuracy and thus be validated. Conversely, if the confidence value is below the confidence value threshold, the depth value of the pixel may be of questionable accuracy, and additional patterns may be projected and used to make additional depth estimations.

Image data, as described herein, may refer to stand-alone frames of image data or to multiple frames of sequential image data, appended together to form a video. Image data may be comprised of a plurality of pixels arranged in a two-dimensional grid including an x component representing a horizontal direction in the grid and a y component representing a vertical direction or axis in the grid. A pixel may be the smallest addressable unit of image data in an image. A particular pixel may be identified by an x value, representing the horizontal position of the pixel in the two-dimensional grid and a y value, representing the vertical position of the pixel in the two-dimensional grid. Additionally, as described herein, pixels of image data may include depth data representing a distance between a surface represented by the pixel of image data and the image sensor (e.g., a depth sensor).

Figure 1A:
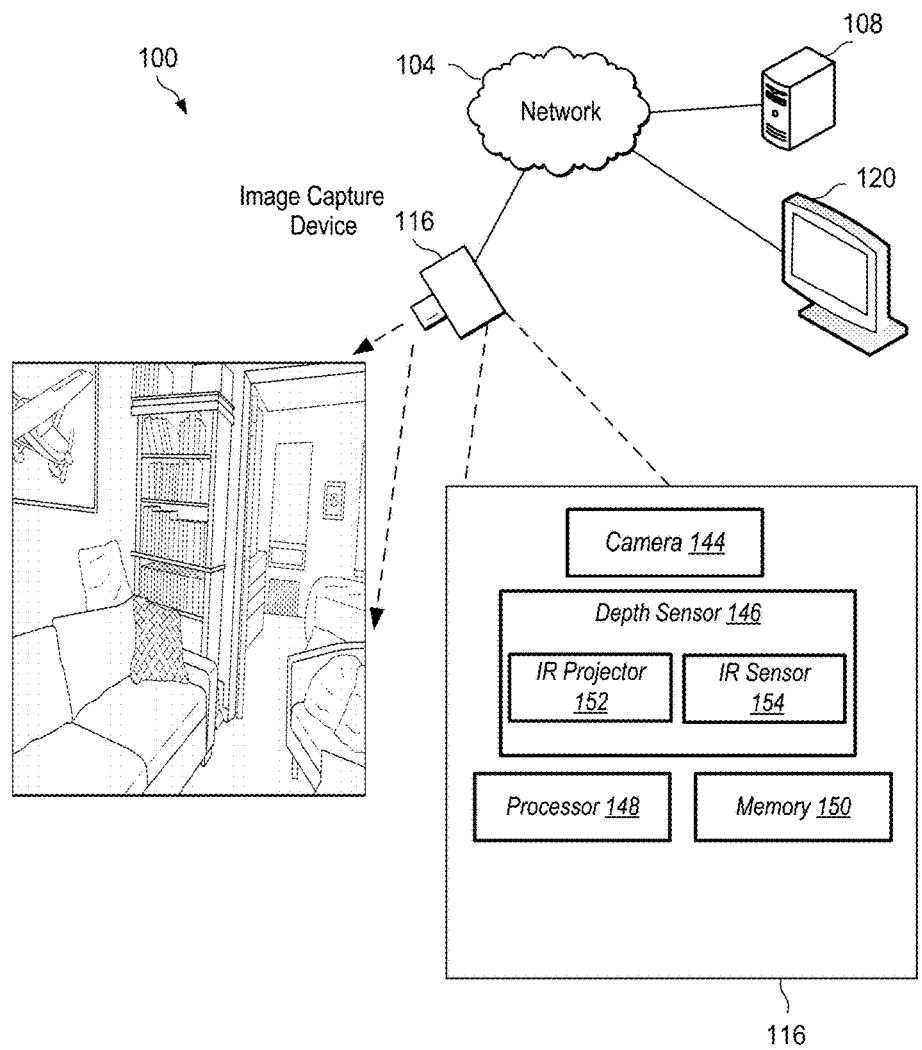
FIG. 1A depicts an example environment of a depth sensor system, arranged in accordance with various aspects of the present disclosure.

FIG. 1A depicts an example image capture system 100 effective to capture image data representing a human subject standing in an environment. As is described in further detail below, image capture system 100 may comprise an image capture device 116. In some examples, image capture system 100 may further comprise one or more processors 108 configured in communication with image capture device 116 over a network 104. In various examples, image capture device 116 may comprise a depth sensor 146 effective to generate depth images. Each pixel in a depth image may comprise a depth value representing a distance between the depth sensor 146 and the portion of the environment represented by the particular pixel.

The image capture device 116 may include a digital camera module 144, which may comprise any suitable type of image sensor device or devices, such as a charge coupled device (CCD) and/or a complementary metal-oxide semiconductor (CMOS) sensor effective to capture image data from environment 100. In various examples, digital camera module 144 of image capture device 116 may comprise a 5 megapixel color (RGB) camera. Image capture device 116 may include one or more lenses and may be positioned so as to capture images of a portion of environment 100 disposed along an optical axis of image capture device 116. In various examples, lenses of image capture device 116 may be wide-angle lenses effective to capture an angle of view greater than about 55°. Image capture device 116 may include, or may be configured to be in communication with, a processing element (e.g., processor 148) and/or a memory (e.g., memory 150). Although in FIG. 1A image capture device 116 is shown as being angled downward, image capture device 116 may be positioned at any angle within environment 100. Various processes described herein as being performed by processor 148 may instead be performed in whole or in part by processor 108 or another processor configured to be in communication with image capture device 116.

Image capture device 116 may further comprise a depth sensor 146. Depth sensor 146 may comprise, for example, an infrared projector 152 or any other infrared light source and an infrared sensor 154. Depth sensor 146 may be configured in communication with processor 148 and memory 150 of image capture device 116. As described in further detail below, processor 148 may execute instructions stored in memory 150 to control infrared projector 152 to emit one or more patterns of structured infrared light. Infrared sensor 154 may detect the structured light reflected from surfaces of environment 100 (e.g., from surfaces of the environment 100). Processor 148 may construct a depth map of the infrared light detected by infrared sensor 154 based on deformations in the patterns of structured IR light reflected from surfaces of environment 100. Depth data may be determined for each pixel in the depth map image data. In various examples, depth data may relate to a distance between the portion of environment 100 represented by a particular pixel and the IR sensor 154. More generally, depth data for a particular pixel may relate to a distance between the portion of environment 100 represented in the image data by the particular pixel and the image capture device 116. As described in further detail below, various techniques may be used to validate depth data determined by processor 148.

In various examples, a depth map generated by depth sensor 146 may model the surface shape, reflectance, color, and/or microgeometry of the environment 100 (including the standing subject and background depicted in FIG. 1A). In some examples, structured light depth sensors may project x number of binary patterns (e.g., gray codes) and may capture a corresponding image of each of the x projected binary patterns. For each pixel captured in the images, the intensity value of the pixel may be decoded to determine the corresponding column of the IR projector associated with the particular gray code. Once the correspondence is determined, the distance between the position of the corresponding column of the IR projector and a point of a ray-plane intersection of infrared light reflected from a portion of the environment may be used to triangulate the depth value for the pixel representing the portion of the environment.

In a further example, the IR projector (e.g., IR projector 152) may be a VGA liquid crystal display (LCD) projector with a resolution of 480 rows by 640 columns. To distinguish between the 640 adjacent columns, a gray code comprising 10 binary patterns may be sequentially projected (as $\log_2 640 = 9.321928$). The intensity value of each pixel in the 10 corresponding images captured by the IR image sensor (e.g., IR sensor 154) may be decoded from the 10 images to identify the corresponding column of the IR projector. One or more processors (e.g., processor 148) may determine a ray-plane intersection between the camera ray and the projector column to triangulate the depth value for the pixel.

In some examples, ambient illumination of the scene, (e.g., strong incandescent lighting, sunlight), diffuse and specular inter-reflections, sub-surface and other volumetric scattering, etc., may cause decoding errors for one or more pixels representing a particular portion of the scene, leading to an incorrect correspondence between pixel (or pixels) and projector column. Typically, since the true depth of the scene is unknown, decoding errors (resulting in depth value errors) may not be detectable. Accordingly, a technique for self-validation of the decoding and depth value estimation is described herein.

Figure 2:
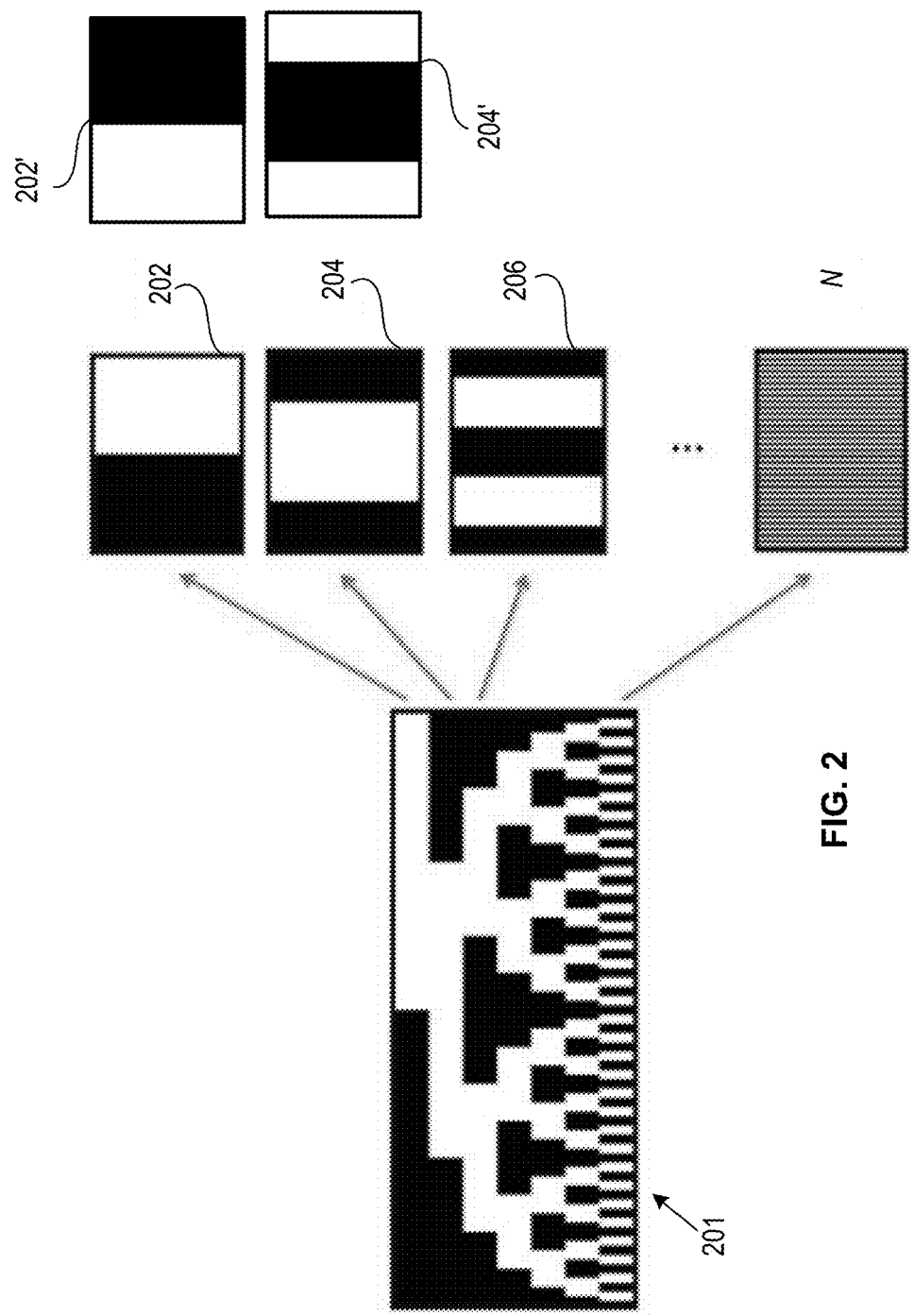
FIG. 2 is a depiction of a binary gray code comprising multiple binary patterns that may be used to perform self-validation of depth data, in accordance with various aspects of the present disclosure.

In time-multiplexed structured light depth sensing, IR projector 152 may project a set of N patterns, sequentially. In other words, projection of a first pattern may be ceased prior to projection of a second pattern. The patterns are binary, as depicted in FIG. 2. As shown in FIG. 2, due to the vertical symmetry of the constituent images, all rows of pixels in a particular column have the same code word for a particular encoding (e.g., for a particular set of gray codes). Each column of pixels has a unique code word of length N. The total number of available code words is $2^N$. Accordingly, to encode the columns of a VGA resolution IR projector (e.g., IR projector 152), 10 binary patterns (e.g., a gray code) may be sequentially displayed (N=10) to provide 1024 unique code words—more than enough to encode each of the 640 pixel columns of a VGA resolution projector (e.g., IR projector 152). The number of binary patterns projected may be altered to account for different resolutions of the IR projector 152. Binary patterns projected by IR projector 152 may comprise a plurality of pattern bit values. Pattern bit values may determine whether pixels of a particular column of the pattern is illuminated with IR light (e.g., a pattern bit value of "1") from IR projector 152 or whether the pixels of the particular column of the pattern are not illuminated (e.g., a pattern bit value of "0") with IR light from IR projector 152. Binary pattern 201 depicted in FIG. 2 is an abstracted representation of a gray code combining constituent binary patterns 202, 204, 206, . . . , N. Each of the constituent binary patterns 202, 204, 206, . . . , N may be a captured frame of image data of the corresponding binary patterns projected by IR projector 152. Additionally, each of the constituent binary patterns 202, 204, 206, . . . , N may comprise x columns of pixels and y rows of pixels. As depicted, the top portion of binary pattern 201 represents the lowest frequency constituent binary pattern 202 in which half of the pixels are illuminated (e.g., white) and half of the pixels are unilluminated (e.g., black) by IR light from IR projector 152. The second-from-the-top row of binary pattern 201 represents binary pattern 204, and so on until the highest frequency binary pattern N at the bottom of binary pattern 201. Thus, for a given pixel address and/or column of pixel addresses, binary pattern 201 encodes a code word of N bits, with each constituent binary pattern 202, 204, 206, . . . , N of binary pattern 201 contributing a single bit value for the code word. The code word is encoded to correspond to a particular column of IR projector 152 that projects the light corresponding to the pixel being evaluated in the captured images of the sequentially projected binary patterns 202, 204, 206, . . . , N. Accordingly, binary pattern 201 may represent an N-bit code word for each pixel address in constituent binary patterns 202, 204, 206, . . . , N. Binary pattern 201 may be conceptually thought of as a set of captured images $\{C_1, C_2, C_3 \ldots C_N\}$, as described in further detail below.

Additionally, by projecting an inverse binary pattern of any member of the set $\{C_{202}, C_{204}, C_{206} \ldots C_N\}$ and capturing the resulting image, an entirely new set may be generated and used for self validation. For example, inverse binary pattern 202' may be the inverse of binary pattern 202. In other words, each illuminated pixel (e.g., each white pixel) of binary pattern 202 may be unilluminated in inverse binary pattern 202' and each unilluminated pixel (e.g., each black pixel) of binary pattern 202 may be illuminated in inverse binary pattern 202'. Similarly, inverse binary pattern 204' may be the inverse of binary pattern 204. Accordingly, in the example, three new sets of N members may be generated using the additional binary patterns. For example, in a first new set, inverse binary pattern 202' may replace binary pattern 202, as follows: $\{C_{202'}, C_{204}, C_{206} \ldots C_N\}$. In a second new set, inverse binary pattern 204' may replace binary pattern 204, as follows: $\{C_{202}, C_{204'}, C_{206} \ldots C_N\}$. In a third new set, inverse binary pattern 202' may replace binary pattern 202 and inverse binary pattern 204' may replace binary pattern 204, as follows: $\{C_{202'}, C_{204'}, C_{206} \ldots C_N\}$. Accordingly, four sets are available for validation purposes (including the original set $\{C_{202}, C_{204}, C_{206} \ldots C_N\}$) while only two additional binary patterns 202' and 204' were projected.

It should be appreciated that although a gray code is depicted in FIG. 2, other encoding techniques may be used to encode binary patterns and may be used in accordance with the self validation techniques described herein.

In order to provide for self-validation of the decoding, additional patterns may be projected, as described herein. For example, a first set of 10 binary patterns: $\{P_1, P_2, P_3 \ldots P_{10}\}$ may be stored in memory 150. Each binary pattern of the first set may be sequentially projected by IR projector 152 to provide a first encoding (e.g., each projected pixel may be encoded with a code word representing a projector column). In various examples, memory 150 may store a data structure associating codes with respective projector columns for the first set of binary patterns $\{P_1, P_2, P_3 \ldots P_{10}\}$. As described in further detail below, a second set of 10 binary patterns may be sequentially projected by IR projector 152 to provide a second encoding (e.g., each projected pixel may be encoded with a code word representing a projector column). In various examples and as described in further detail below, the first set of binary patterns and the second set of binary patterns may be different. Accordingly, code words for particular pixels may be different when decoding captured images captured for the first set and captured images captured for the second set. However, processor 148 (and/or processor 108) may encode the first set of binary patterns and the second set of binary patterns such that, a first code word encoded for any given pixel (e.g., for a particular pixel address common to the captured images of the set of projected binary patterns) in the first set corresponds to the same projector column as a second code word encoded for the given pixel in the second set. The first code word may comprise values for the particular pixel address among each of the captured images of the first set of projected binary patterns. Similarly, the second code word may comprise values for the particular pixel address among each of the captured images of the second set of projected binary patterns. In some examples, a pixel value of "1" may denote that the pixel address is illuminated with IR light in the captured image. Similarly, a pixel value of "0" may denote that the pixel address is unilluminated in the captured image. It should be appreciated that in other examples the pixel values may be encoded differently. As described below, a rigorous validation of depth values may be achieved without projecting an entirely new set of N different binary patterns.

Additional binary patterns may be stored in memory 150. The additional patterns may be designed to supplant one of the members of the first set of binary patterns without altering the encoding of the projector columns. For example, a binary pattern $P_{11}$ may be stored in memory 150. Binary pattern $P_{11}$ may be the inverse of binary pattern $P_1$. For example, binary pattern $P_{11}$ may comprise pattern bit values that are the inverse of the pattern bit values of pattern $P_1$ such that each pattern bit value of pattern $P_{11}$ is an inverse of a corresponding bit value in patter $P_1$. Accordingly, for a given pixel, the first set of 10 binary patterns: $\{P_1, P_2, P_3 \ldots P_{10}\}$ may encode the same projector column as a modified first set of 10 binary patterns wherein pattern $P_{11}$ supplants binary pattern $P_1$ in the modified first set, as follows: $\{P_{11}, P_2, P_3 \ldots P_{10}\}$.

Figure 1B:
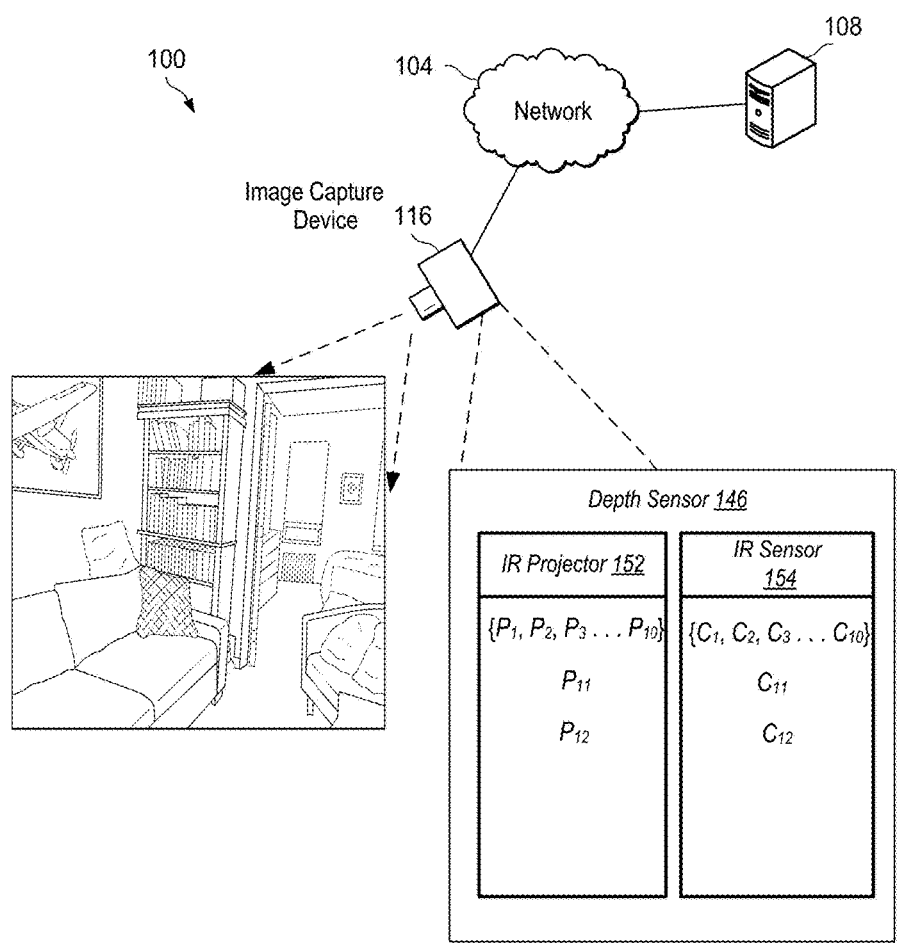
FIG. 1B depicts the example environment of the depth sensor system of FIG. 1A with additional detail regarding the IR projector and the IR sensor, in accordance with various aspects of the present disclosure.

In an example, IR projector 152 may project the first set $\{P_1, P_2, P_3 \ldots P_{10}\}$ and IR sensor 154 may capture corresponding images $\{C_1, C_2, C_3 \ldots C_{10}\}$ of each member binary pattern of the first set as projected on the scene, as depicted in FIG. 1B. IR projector 152 may project additional binary pattern $P_{11}$, the inverse of binary pattern $P_1$. IR sensor 154 may capture an image $C_{11}$ of binary pattern $P_{11}$, as projected on the scene. Processor 148 may decode the first set of 10 captured images $\{C_1, C_2, C_3 \ldots C_{10}\}$ to produce a first code word for each pixel. Each of the first code words may be stored in memory 150 in association with the corresponding first projector columns based on the encoding of the first set $\{P_1, P_2, P_3 \ldots P_{10}\}$. The first code words may correspond to respective projector columns of IR projector 152.

Processor 148 may decode a modified first set of captured images ($\{C_{11}, C_2, C_3 \ldots C_{10}\}$) to produce a second code word for each pixel. Each of the second code words may be stored in memory 150 in association with the corresponding second projector columns based on the encoding of the modified first set $\{P_{11}, P_2, P_3 \ldots P_{10}\}$. For each pixel, processor 148 may compare the first projector column decoded from the first set of captured images $\{C_1, C_2, C_3 \ldots C_{10}\}$ to the second projector column decoded from the modified first set of captured images $\{C_{11}, C_2, C_3 \ldots C_{10}\}$ to validate the decoding. For a given pixel, if the first projector column and the second projector column match, processor 148 may determine that the depth value estimation for the pixel can be assigned a high confidence value. Conversely, if the first projector column for the given pixel and the second projector column for the given pixel do not match, the depth value estimation for the pixel may be assigned a low confidence value indicating that the depth value estimation may not be accurate for the pixel. In at least some examples, if a low confidence value is assigned to a particular pixel, additional binary images may be projected to generate different unique encodings of the projector columns in order to adaptively determine the accuracy of the depth estimation for the particular pixel, as described in further detail below. Additionally, in some examples, the confidence value assigned to a pixel may be compared to a confidence threshold value to determine if additional validation techniques should be performed or whether additional images should be projected for depth estimation.

More than one additional binary pattern may be used for self-validation of depth value estimation. In general, for a 10 member set, up to 10 additional binary patterns may be defined and stored in memory 150 (more generally, for a set of z members, up to z additional binary patterns may be defined). In the example, the 10 additional binary patterns may be defined as $P_{(10+n)}$=inverse of $P_n$. In general, each additional pattern k provides $2^k$ sets for validation. For each additional set used to validate the depth value of a pixel, if the projector column determined for the pixel matches a previously decoded projector column of the pixel, the confidence value for the pixel may be increased and/or set to a predetermined value (e.g., "high_confidence_value").

For example, if k=2, additional binary patterns $P_{11}$ and $P_{12}$ may be generated and projected. Additional binary patterns $P_{11}$ and $P_{12}$ may be the inverse of binary patterns $P_1$ and $P_2$, respectively. Accordingly, IR sensor 154 may capture a first image $C_{11}$ of binary pattern $P_{11}$, as projected on the scene, and a second image $C_{12}$ of binary pattern $P_{12}$, as projected on the scene. Thereafter, processor 148 may form 4 ($2^2$) sets of projected images to use for self-validation. For example, Set_1={$P_1, P_2, P_3 \ldots P_{10}$}; Set_2={$P_{11}, P_2, P_3 \ldots P_{10}$}; Set_3={$P_1, P_{12}, P_3 \ldots P_{10}$}; Set_4={$P_{11}, P_{12}, P_3 \ldots P_{10}$}. For a given pixel, the respective projector columns decoded from Set_1, Set_2, Set_3, and Set_4 may be compared by processor 148 for validation purposes. Note that in the example only two additional images are required to be projected and captured in order to generate the additional self-validation data points.

In various examples, closed loop methods may be used in which the number of additional binary patterns may be adaptively computed based on how many pixels are assigned a high confidence based on a previous self-validation. For example, initially a first additional binary pattern $P_{11}$ (the inverse of binary pattern $P_1$) may be employed (e.g., k=1). Self-validation may be performed in accordance with the techniques described above based on the sets {$P_1, P_2, P_3 \ldots P_{10}$} ("Set_1") and {$P_{11}, P_2, P_3 \ldots P_{10}$} ("Set_2"). In an example, if greater than a predefined threshold percentage of pixels of a first captured image from among the total number of pixels in the first captured image (e.g., >70%, 72%, 75%, 82.1%, 90%, etc.) are determined to have confidence values above a predefined threshold confidence value based on decoding of the captured images of Set_1 and Set_2, processor may determine that an acceptable depth estimation has been achieved. Accordingly, the estimated depth values for the first captured image may be validated. Conversely, if more than a predefined threshold percentage of pixels are determined to have confidence values that are below the predefined threshold, additional binary patterns may be projected to generate additional sets for self-validation. Additionally, in some examples, the confidence value of a pixel after validation may be compared to a threshold confidence value to determine if the depth value for the pixel is validated. In various examples, the threshold depth value may be adaptively computed based on depth validation of nearby pixels (e.g., pixels within a local spatial region of the pixel currently being evaluated).

In another "per-pixel" example, if a low confidence value is assigned to a pixel based on a first additional binary pattern $P_{11}$ (the inverse of binary pattern $P_1$; k=1), the value of k may be adaptively increased until greater than a predetermined number or percentage of decodings yield matching projector columns. In various examples, processor 148 may limit the number of validation iterations for a given pixel if the confidence value for the pixel does not meet an acceptable level after a threshold number of iterations.

For example, image capture device 116 may be validating a particular pixel. Image capture device 116 may have projected k=3 additional binary patterns and compared 8 ($2^3$) different decodings (e.g., decoded projector columns) for the pixel. If less than 50% (or some other predetermined threshold percentage) of the decoded projector columns from the 8 different sets match, processor 148 may determine that the depth value for the pixel is likely in error. Image capture device 116 may ignore the depth value for the pixel in subsequent image processing, may revalidate using different IR lighting patterns (e.g., masking out pixels in regions surrounding the problematic pixel), and/or may verify the depth estimation for the pixel based on surround pixels.

Additionally, the spatial relationships of high confidence value pixels and low confidence value pixels may be used to adaptively determine whether to increase the value of k. For example, if a majority of pixels in a spatially localized region have been assigned low confidence values, additional projections may be used (e.g., k may be increased) in order to generate additional validation sets (e.g., additional unique encodings of the columns of IR projector 152). Further, other pixels outside the region may be masked out (e.g., set to block or binary "0") during additional projections in order to reduce the amount of inter-reflection and IR noise. Conversely, if pixels assigned low confidence values are spatially diverse (e.g., spread out in a frame of image data) processor 148 may determine such unvalidated pixels constitute an acceptable level of noise and that no further validation is currently required and/or that an acceptable depth estimation for the frame and/or frames has been achieved.

Further, in various examples, if the self-validation techniques described above result in a determination that a pixel has been decoded correctly based on encoded projector columns for the pixel matching for different sets of captured images, the pixel may be masked (e.g., set to black or binary "0") for subsequent projection and/or validation iterations. Advantageously, masking pixels that have been determined to be decoded correctly can reduce the amount of infrared light on the scene which can reduce IR reflectivity, inter-reflection, and unnecessary ambient light, thereby improving the depth estimation.

Further, although the additional patterns described above are described as being the inverse of a member of the initial set of binary patterns, other (non-inverse) binary patterns may be used. Any binary pattern not included in the original set (e.g., {$P_1, P_2, P_3 \ldots P_{10}$}) but which provides a unique encoding of the same projector column when supplanting a member of the original set may be used in accordance with the various techniques described herein.

Additionally, in various other examples, an entirely different set of projected binary patterns may be used to encode the same projector column. For example, Set_1 may include {$P_1, P_2, P_3 \ldots P_{10}$} while Set_2 may include {$P_{11}, P_{12}, P_{13} \ldots P_{20}$}. However, such a validation technique requires IR projector 152 to project 2N (where N=10 in the current example) binary patterns. Additionally, IR sensor 154 is required to capture the 2N projected binary patterns. Various techniques described above allow for self-validation by projecting and capturing as few as N+1 (e.g., for N=10, IR projector 152 projects {$P_1, P_2 \ldots P_{11}$} and IR sensor 154 captures corresponding images {$C_1, C_2 \ldots C_{11}$}) patterns resulting in a significant increase in speed as fewer images need to be projected and captured. Furthermore, using the techniques described herein, $2^k$ validation sets are generated for each additional projected image k. For example, 2 additional images projected (k=2) yields 4 validation sets. By contrast, if each set comprises unique patterns, 40 patterns (four 10-member sets) would need to be projected and imaged to provide the same level of validation of depth values. Additionally, projecting fewer patterns results in a corresponding reduction in processing time. Such an increase in speed and a corresponding reduction in processing time may be particularly beneficial when performing depth estimation in dynamic situations (e.g., if the depth sensor 146 is used to detect rapid motion as a part of a video game controller). Additionally, using inverse patterns is advantageous as low frequency patterns can be inverted with little to no risk of changing the spatial frequency of the binary codes. Projecting a large number of patterns for depth value validation risks a loss of spatial frequency which, in turn, decreases validation efficiency.

Figure 3:
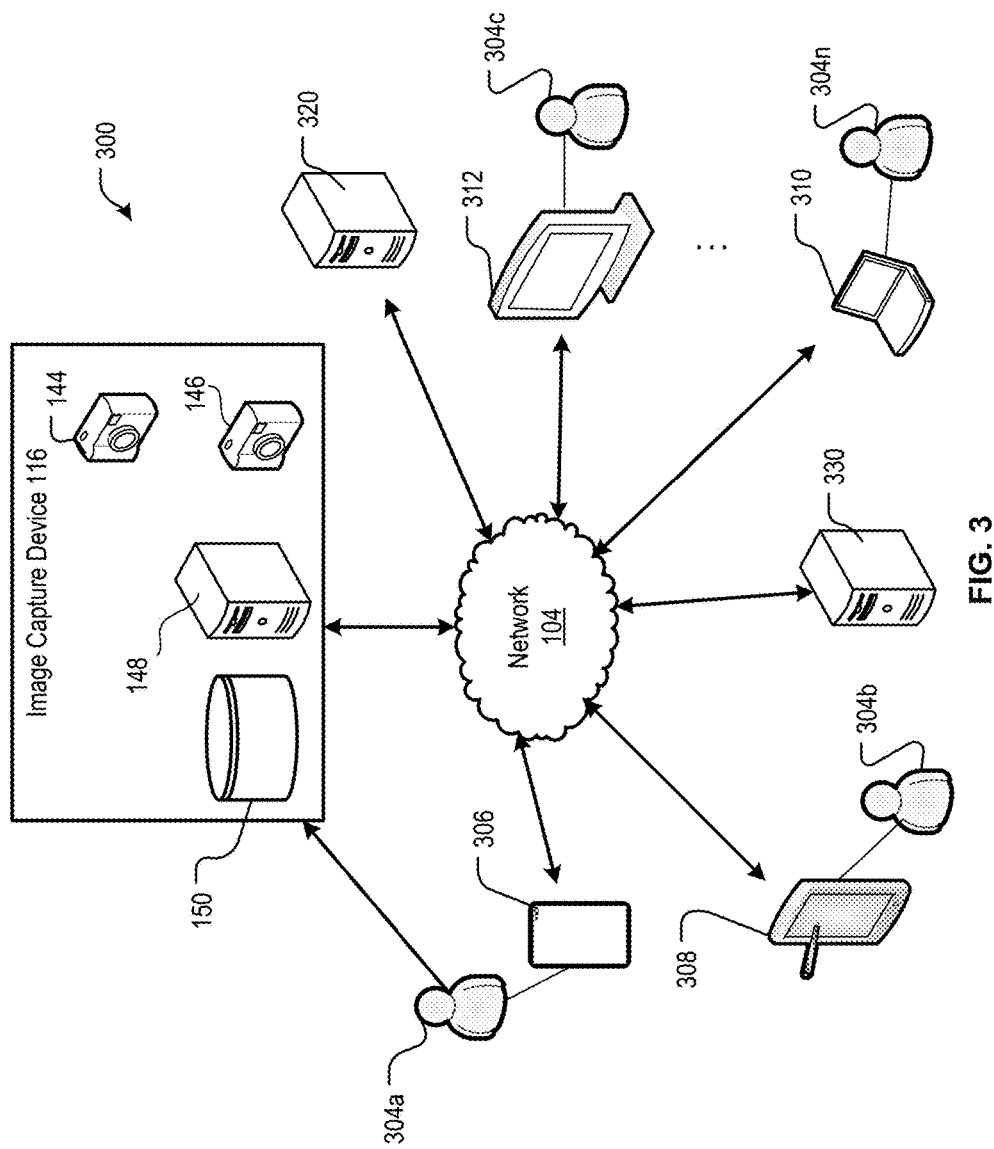
FIG. 3 is a diagram showing an example environment with which the depth sensor system depicted in FIG. 1A may be used, in accordance with various aspects of the present disclosure.

FIG. 3 is a diagram showing one example of an environment 300 with which the image capture system depicted in FIG. 1A may be used, in accordance with various aspects of the present disclosure. The environment 300 comprises image capture device 116 and users 304a, 304b, 304c, 304n. Each user 304a, 304b, 304c, and 304n may use one or more user devices such as, for example, mobile device 306, tablet computer 308, laptop computer 310, and/or display device 312. Although four users 304a, 304b, 304c, 304n are shown, any suitable number of users may be part of the environment 300. Also, although each user 304a, 304b, 304c, 304n shown in FIG. 3 is associated with a particular device (such as mobile device 306 associated with user 304a, tablet computer 308 associated with user 304b, display device 312 associated with user 304c, and laptop computer 310 associated with user 304n), each user 304a, 304b, 304c, 304n may use additional user devices or fewer user devices from what is shown. Additionally, each user 304a, 304b, 304c, 304n may use different user devices apart from what is shown in environment 300 of FIG. 3.

Image capture device 116 may perform the various utilities described herein including, for example, automatic object segmentation in image data. As shown and described, image capture device 116 may comprise one or more digital camera modules 144, one or more depth sensors 146, one or more processors 148, and/or one or more memories 150. Although not depicted in FIG. 3, image capture device 116 may also comprise one or more infrared sensors and/or one or more image filters used for image processing. In some examples, the memory 150 may store images captured by the one or more digital camera modules 144, or received from the various user devices, as well as instructions for image data segmentation, as described herein. In some examples, the various components 144, 146, 148, and/or 150 of the image capture device 116 may be at a common geographic location and/or may be distributed across multiple geographic locations. For example, one or more processors 148 effective to perform image processing of image data captured by image capture device 116 (e.g., depth estimation and self-validation, as described herein) may be implemented in whole or in part as a cloud or Software as a Service (SaaS) system. In some examples, the image capture device 116 may perform object segmentation of image data, etc. on images received from multiple different users 304a, 304b, 304c, 304n (e.g., via their associated cameras, computing devices, or other devices). In various other examples, image capture device 116 may perform object segmentation of image data and various other image processing techniques described herein using image data captured locally by the one or more digital camera modules 144. Various user devices (such as mobile device 306 associated with user 304a, tablet computer 308 associated with user 304b, display device 312 associated with user 304c, and laptop computer 310 associated with user 304n) may include a companion application effective to send instructions to image capture device 116. For example, user 304a may execute a companion application on mobile device 306 and may send commands to image capture device 116. In various examples, user 304a may use the companion application to capture image data with image capture device 116 and to segment various objects represented in the captured image data (e.g., objects of interest) from other objects represented in the captured image data (e.g., background objects).

The various components of the environment 300 may be in communication with one another via a network 104. As described previously, the network 104 may be and/or comprise any suitable wired or wireless network configured according to any suitable architecture or protocol. In some examples, the network 104 may comprise the Internet.

User devices, such as mobile device 306, tablet computer 308, display device 312, and laptop computer 310 may be utilized to control image capture device 116 to capture still and/or video images. In various examples, user devices may execute a companion application to control operation of image capture device 116. Similarly, in some examples, user devices such as mobile device 306, tablet computer 308, display device 312, and laptop computer 310 may be utilized to send image data captured by and/or processed by image capture device 116 to integrated or external display devices for display. For example, image capture device 116 may comprise a short throw projector device (not shown in FIG. 3). A user device such as tablet computer 308 may be effective to send an instruction to image capture device 116 (e.g., through a companion application) to send image data to the short throw projector device for display.

In some examples, user devices including mobile device 306, tablet computer 308, display device 312, and/or laptop computer 310 may be configured to communicate with other components of the environment 300 utilizing, for example, a wired or wireless connection. For example, mobile device 306, tablet computer 308, display device 312, and/or laptop computer 310 may send and receive data (such as, for example, commands and/or image data) via a wired connection, such as Universal Serial Bus (USB), or wireless connection, such as near field communication (NFC) or Bluetooth. In some examples, the user devices may be configured to receive still images and/or video directly from image capture device 116, for example, via the network 104. Although user devices are described as mobile device 306, tablet computer 308, display device 312, and/or laptop computer 310, the user devices may be any suitable type of computing device comprising at least one processor and non-transitory computer-readable memory. In some examples, the user devices may be configured to receive image frames captured by the image capture device 116. In some examples, the user devices, such as mobile device 306, tablet computer 308, display device 312, and/or laptop computer 310, may be configured to communicate on a cellular or other telephone network.

In various examples, users, such as users 304a, 304b, 304c, 304n may control image capture device 116 using audible commands. For example, a user 304a may speak a "wake word" that may be a spoken, audible command. A wake word may be, for example, a word or phrase for which a wake word engine of image capture device 116 continually listens. A microphone of image capture device 116 may detect the spoken wake word and, in response, subsequent audio captured by the microphone may be processed to detect further audible commands and/or the subsequent audio received by the microphone of image capture device 116 may be transmitted to a voice recognition server 320. In the example, user 304a may "wake" the image capture device 116 to further voice commands using the wake word, and may thereafter speak an audible command for image capture device 116 to take a video or take a picture. Similarly, a user may speak an audible command for image capture device 116 to recalibrate by, for example, using the self-validation techniques for depth estimation described herein. For example, a user may speak an audible command for the image capture device 116 to recalibrate. Audio may be transmitted/streamed from image capture device 116 over network 104 to voice recognition server 320 in any audio file format, such as mp3, mp4, or the like. Voice recognition server 320 may receive the transmitted or streamed audio.

Upon determining that the audio content has reached an endpoint, voice recognition server 320 may analyze the received audio stream and may translate the audio stream into natural language. Voice recognition server 320 may determine whether or not the natural language corresponds to a command. If so, the voice recognition server 320 may send the command over network 104 to image capture device 116. For example, a user 304a may speak the command, "Take a picture" to image capture device 116. Image capture device 116 may transmit the voice command to voice recognition server 320. Voice recognition server 320 may analyze the audio stream and may translate the audio stream into natural language. Voice recognition server 320 may determine that the natural language "Take a picture" corresponds to a command effective to instruct image capture device 116 to capture an image using digital camera module 144 and/or depth sensor 146. Voice recognition server 320 may send the command over network 104 to image capture device 116. The command may be effective to cause image capture device 116 to capture an image.

In other examples, a user 304a may speak the command, "Take video" to image capture device 116. Image capture device 116 may transmit the voice command to voice recognition server 320. Voice recognition server 320 may analyze the audio stream and may translate the audio stream into natural language. Voice recognition server 320 may determine that the natural language "Take video" corresponds to a command effective to instruct image capture device 116 to capture a video. Voice recognition server 320 may send the command over network 104 to image capture device 116. The command may be effective to cause image capture device 116 to capture a video.

In some embodiments, the microphone for capturing voice commands may be a far field microphone. In some embodiments, the microphone may be provided on a different device separate from the image capture device 116. The processing of the voice command and/or transmission of the audio to the voice recognition server 320 may similarly be performed by a device other than the image capture device 116.

In various examples in which the various image processing techniques (e.g., object segmentation in image data) are implemented at least in part in a cloud service or SaaS environment, such techniques may be performed at an image processing device 330. Although depicted as different computing devices in FIG. 3, in some examples, image processing device 330 and voice recognition server 320 may be implemented in the same housing. Similarly, in various examples, image processing device 330 may be implemented in the same housing as image capture device 116. In yet other examples, image processing device 330 may receive image data captured by image capture device 116 via network 104. After performing validation of depth estimation in accordance with the various techniques described herein, image processing device 330 may send instructions over network 104 to image capture device 116 and/or to one or more user devices and/or other computing devices.

Figure 4:
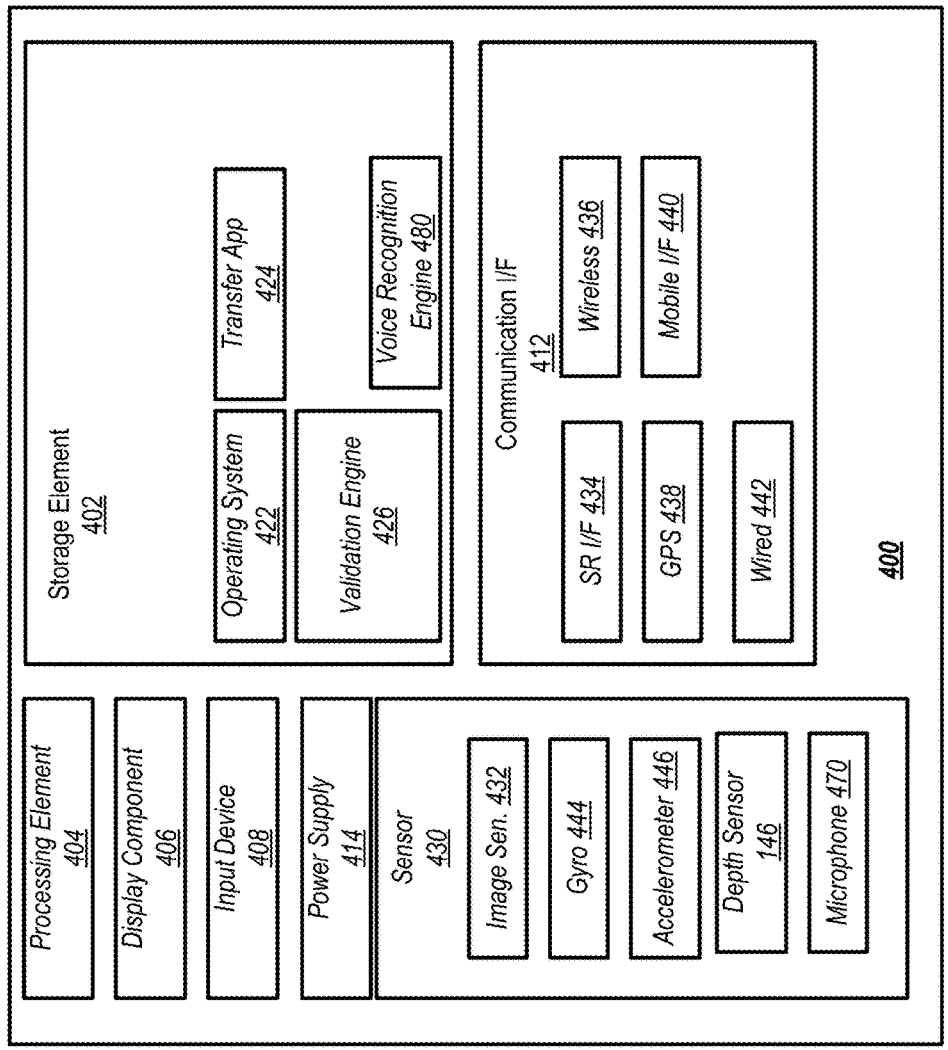
FIG. 4 is a block diagram showing an example architecture of a computing device in which the depth sensor system described in the present disclosure, or a portion thereof, may be implemented, in accordance with various embodiments described herein.

FIG. 4 is a block diagram showing an example architecture 400 of a user device, such as the image capture devices, cameras, display devices, mobile devices, and/or other computing devices described herein. It will be appreciated that not all user devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to perform object segmentation techniques for image data, as described above. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc.

The storage element 402 may also store software for execution by the processing element 404. An operating system 422 may provide the user with an interface for operating the user device and may facilitate communications and commands between applications executing on the architecture 400 and various hardware thereof. A transfer application 424 may be configured to send and/or receive image and/or video data to and/or from other devices (e.g., a mobile device, image capture device, and/or display device). In some examples, the transfer application 424 may also be configured to upload the received images to another device that may perform processing as described herein (e.g., a mobile device, another computing device, and/or image processing device 330). Validation engine 426 may be effective to perform self-validation of depth estimation using the various techniques described in further detail below.

When implemented in some user devices, the architecture 400 may also comprise a display component 406 (e.g., display 120 depicted in FIG. 1A). The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 for capturing sounds, such as voice commands. Voice recognition engine 480 may interpret audio signals of sound captured by microphone 470. In some examples, voice recognition engine 480 may listen for a "wake word" to be received by microphone 470. Upon receipt of the wake word, voice recognition engine 480 may stream audio to a voice recognition server for analysis, as described above in reference to FIG. 3. In various examples, voice recognition engine 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other user devices such as the user devices depicted in FIG. 3 (including mobile device 306 associated with user 304a, tablet computer 308 associated with user 304b, display device 312 associated with user 304c, and laptop computer 310 associated with user 304n). For example, the communication interface 412 may comprise a wireless communication module 436 configured to communicate on a network, such as the network 104, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol. In various examples where architecture 400 represents image capture device 116 (shown in FIG. 1A), mobile interface 440 may allow image capture device 116 to communicate with one or more other computing devices such as the various computing devices shown in FIG. 3. For example, image capture device 116 may receive a command from a user device, an application of a user device, or a voice recognition server to capture an image. Image capture device 116 may receive a command from the user device to send the captured image frame to the mobile device or to a social media site.

The architecture 400 may also include one or more sensors 430 such as, for example, one or more position sensors, image sensors, and/or motion sensors. An image sensor 432 is shown in FIG. 4. Some examples of the architecture 400 may include multiple image sensors 432. For example, a panoramic camera system may comprise multiple image sensors 432 resulting in multiple images and/or video frames that may be stitched and may be blended to form a seamless panoramic output.

Motion sensors may include any sensors that sense motion of the architecture including, for example, gyro sensors 444 and accelerometers 446. Motion sensors, in some examples, may be used to determine an orientation, such as a pitch angle and/or a roll angle, of image capture device 116 and/or display device 120 (shown in FIG. 1A). The gyro sensor 444 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 446 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 438 may be utilized as a motion sensor. For example, changes in the position of the architecture 400, as determined by the GPS interface 438, may indicate the motion of the GPS interface 438. Depth sensor 146 may be effective to determine a distance between image capture device 116 and a surface detected by depth sensor 146. In some examples, the depth sensor 146 may determine the contours of the surface and may be capable of using computer vision techniques to recognize facial patterns or other markers within the field of view of the depth sensor 146's infrared sensor. In some examples, the depth sensor 146 may include an infrared projector and camera. Processing element 404 may build a depth map based on detection by the infrared camera of a pattern of structured light displayed on a surface by the infrared projector. In some other examples, the depth sensor 146 may include a time of flight camera that may compute distance based on the speed of light by measuring the time of flight of a light signal between a camera of the depth sensor 146 and a surface of environment 100 (shown in FIG. 1A) In some examples, processing element 404 may be effective to determine the location of various objects in the physical environment within the field of view of image capture device 116 based on the depth map created by the depth sensor 146. As noted above, in some examples, non-infrared depth sensors, such as passive stereo camera pairs, or non-identical camera pairs, may be used in image capture device 116 in place of, or in addition to, infrared light sources of depth sensor 146. Processing element 404 may build a depth map based on detection by non-infrared depth sensors of a pattern of light displayed on a surface by a light source. Processing element 404 may be effective to determine the location of various objects in the physical environment within the field of view of image capture device 116 based on the depth map created by one or more non-infrared depth sensors.

Figure 5:
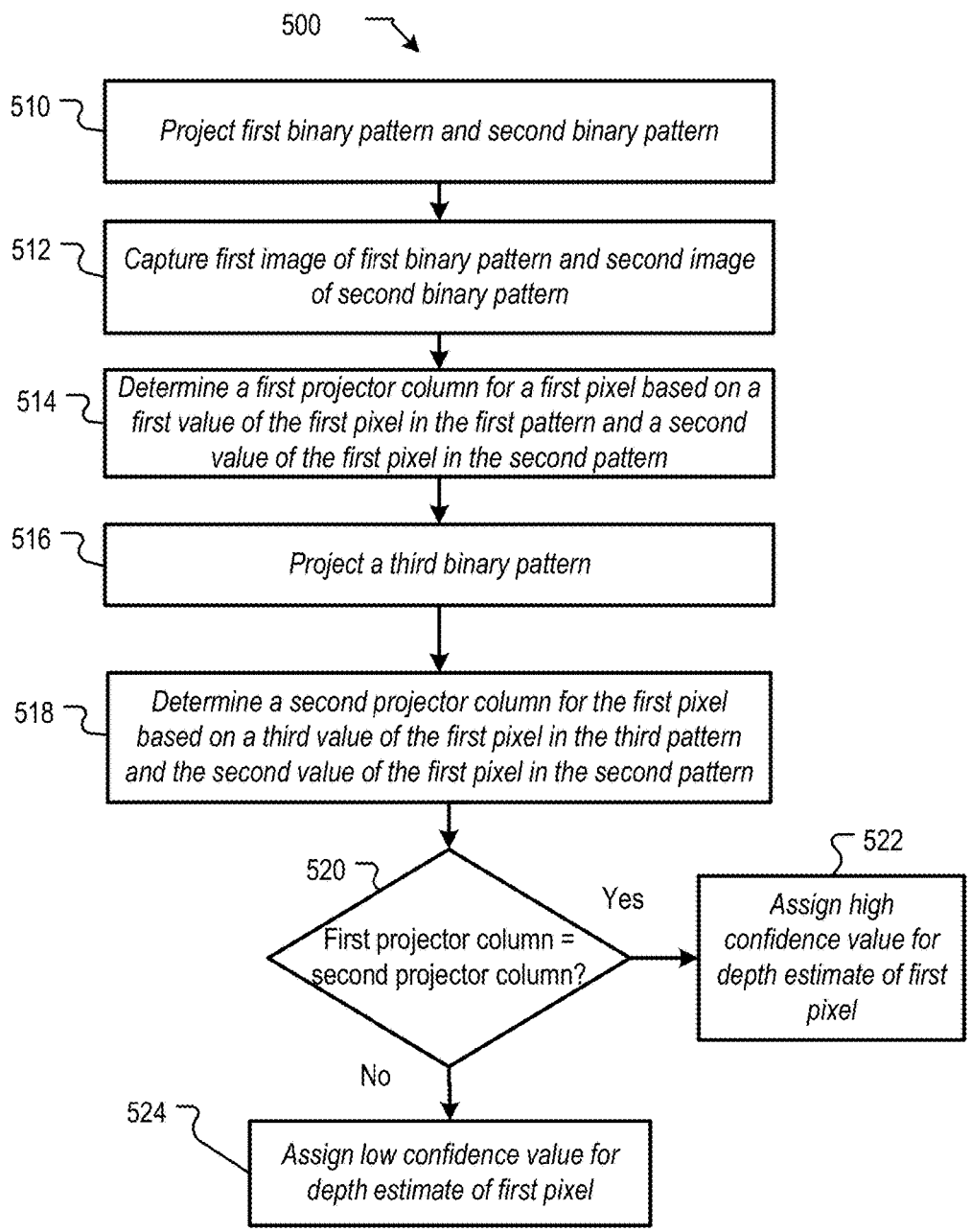
FIG. 5 depicts a flow chart showing an example process for validation of depth data, in accordance with various aspects of the present disclosure.

FIG. 5 is a flow chart showing an example process for validation of depth data, in accordance with various aspects of the present disclosure. The process flow 500 of FIG. 5 may be executed by image capture device 116, by a combination of image capture device 116 and a computing device configured to be in communication with image capture device 116, and/or by one or more computing devices configured to be in communication with image capture device 116, in accordance with various aspects of the present disclosure. The actions of process flow 500 may represent a series of instructions comprising computer-readable machine code executable by a processing unit of a computing device or of image capture device 116. In various examples, the computer-readable machine code may be comprised of instructions selected from a native instruction set of the computing device and/or an operating system of the computing device. Various actions in process flow 500 may be described with reference to elements of FIGS. 1-4.

At action 510 of process flow 500, IR projector 152 or another projector may project a first binary pattern and a second binary pattern. As described above, in at least some examples, the first and second binary patterns may be binary patterns of a gray code used to encode various columns of the IR projector 152 or other projector. For example, the first binary pattern may be $P_1$ and the second binary pattern may be a pattern $P_2$, as described above. The first and second binary patterns may be similar to the binary patterns 202, 204, 206, etc. depicted in FIG. 2.

Processing may continue from action 510 to action 512, "Capture first image of first binary pattern and second image of second binary pattern." At action 512, an image sensor such as IR sensor 154 depicted in FIG. 1A may capture images of the first binary pattern and the second binary pattern as projected onto the local environment. In some examples, image capture device 116 (FIG. 1A) may be effective to store the captured images in memory 150 (FIG. 1A).

Processing may continue from action 512 to action 514, "Determine a first projector column for a first pixel based on a first value of the first pixel in the first pattern and a second value of the first pixel in the second pattern." At action 514, a processor, such as processor 148 depicted in FIG. 1A, may determine a code encoded for a particular pixel address of the captured images stored in memory 150. The particular pixel address may be common to the captured images (e.g., the particular pixel address may be in a corresponding x, y location in a pixel grid of each captured image). Each sequential image stored in memory 150 may represent a bit position for the code. For example, in the first binary image projected and captured, the pixel being evaluated may be "white" and thus correspond to a value of 1 at a first bit position. In the second binary image projected and captured, the pixel under evaluation may be "black" and thus correspond to a value of 0 at the second bit position. Accordingly, if the code was 2 bits in length, the code word may be "01". In at least some of the examples described herein, the bit length of the code word may depend on the resolution of the projector. For example, for a 480 rows×640 column VGA resolution projector, a 10 bit code word may be used. Accordingly, 10 images may be projected at action 510 and 10 corresponding images may be captured at action 512. At action 514, the 10 bit code word may be determined for each pixel (e.g., each pixel address in the 10 captured images) based on the sequential values for each pixel in the 10 captured images. In some examples, the 10 bit code word may encode one of the 10 projector columns for the first set of 10 projected images projected at action 510. Accordingly, for each pixel, the distance between the position of the projector column projecting that pixel and the portion of the scene represented by that pixel may be triangulated using a triangulation technique.

Processing may proceed from action 514 to action 516, "Project a third binary pattern." At action 516, a third binary pattern may be projected by IR projector 152 and/or by another projector. In various examples, the third binary pattern may be generated by processor 148 or by another processor such that the third binary pattern is effective to supplant one of the binary patterns in the set encoding a particular projector column without affecting the decodability of the projector column. For examples, the third binary pattern may be the binary inverse of the first binary pattern or the second binary pattern. For example, as depicted in FIG. 2, inverse binary pattern 202' is the inverse of binary pattern 202. Similarly, inverse binary pattern 204' is the inverse of binary pattern 204.

Processing may proceed from action 516 to action 518, "Determine a second projector column for the first pixel based on a third value of the first pixel in the third pattern and the second value of the first pixel in the second pattern." At action 518, the third pattern may be an inverse of the first pattern and may supplant the first pattern in determining the projector column for the first pixel. Accordingly, the projector column word may be decoded based on at least the third value of the first pixel in the third pattern and the second value of the first pixel in the second pattern.

Processing may proceed from action 518 to action 520 at which a determination may be made whether the first projector column is the same as the second projector column. If so, processing may proceed from action 520 to action 522 at which a high confidence value for a depth estimate of the first pixel may be assigned based on the validation of the first pixel using the two separately-encoded projector columns code words (e.g., the first projector column encoded based on the first image and second image and the second projector column encoded based on the third image and the second image). If, at action 520, the first projector column does not match the second projector column, processing may proceed from action 520 to action 524, "Assign low confidence value for depth estimate of first pixel."

Figure 6:
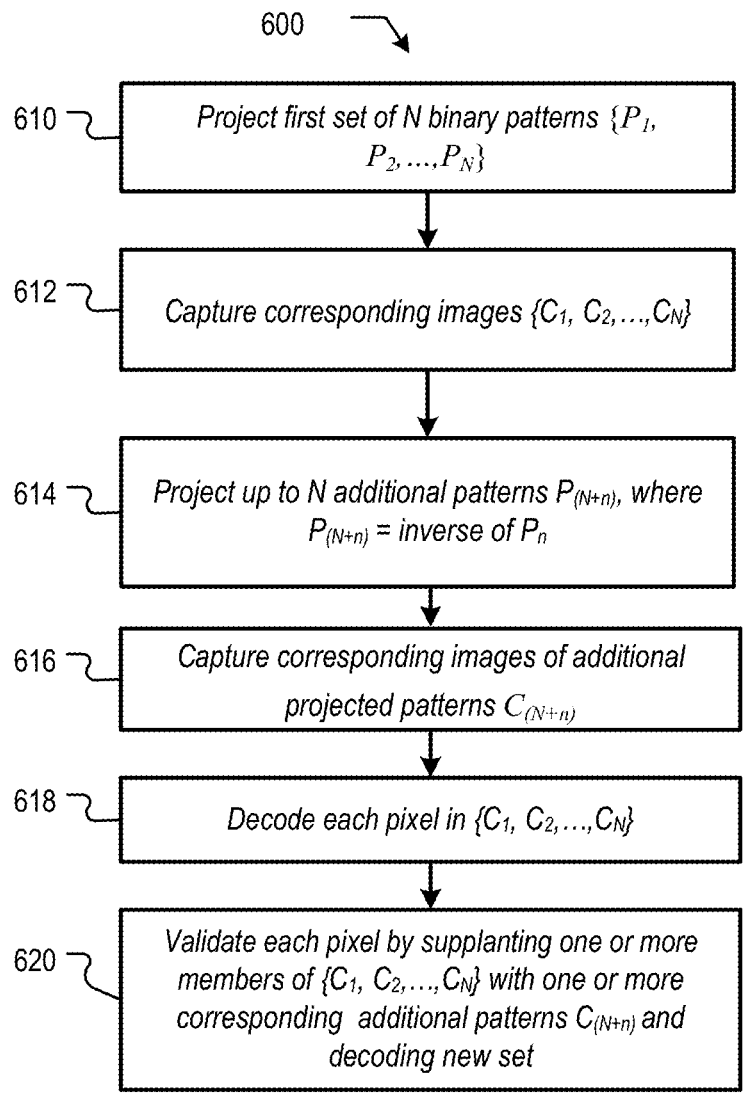
FIG. 6 depicts a flow chart showing another example process for validating depth data, in accordance with various aspects of the present disclosure.

FIG. 6 is a flow chart depicting an example process for validating depth data, in accordance with various aspects of the present disclosure. The process flow 600 of FIG. 6 may be executed by image capture device 116, processor 148, processor 108, IR projector 152, IR sensor 154, and/or by a combination of these devices. The actions of process flow 600 may represent a series of instructions comprising computer-readable machine code executable by a processing unit of a computing device or of image capture device 116 (or of some combination thereof). In various examples, the computer-readable machine code may be comprised of instructions selected from a native instruction set of the computing device and/or an operating system of the computing device. Various actions in process flow 600 may be described with reference to elements of FIGS. 1-5. At least some of the actions in the process flow 600 may be optional depending on the desired implementation.

Processing of process flow 600 may begin at action 610 "Project first set of N binary patterns $\{P_1, P_2, \ldots, P_N\}$." At action 610, a first set of N binary patterns may be projected. The N binary patterns may encode each pixel with a code representing a particular column of the projector device projecting the particular pixel.

Processing may continue from action 610 to action 612: "Capture corresponding images $\{C_1, C_2, \ldots, C_N\}$." At action 612, an image sensor such as IR sensor 154 may capture an image of each of the first set of projected binary patterns $\{P_1, P_2, \ldots, P_N\}$ as reflected from the scene projected onto the environment. The first set of projected binary patterns $\{P_1, P_2, \ldots, P_N\}$ may be a first encoding of pixel addresses to the projector columns of IR projector 152

Processing may continue from action 612 to action 614: "Project up to N additional patterns $P_{(N+n)}$, where $P_{(N+n)}$ =inverse of $P_n$." At action 614, up to N additional binary patterns may be projected. Each binary pattern may be the inverse of a member of the set $\{P_1, P_2, \ldots, P_N\}$. Accordingly, the inverse member $P_{(N+n)}$ may supplant the corresponding member $P_n$ in the set $\{P_1, P_2, \ldots, P_N\}$ without altering the decodability. In other words, the modified set, including one or more supplanted inverse binary images, (e.g. $\{P_{11}, P_2, \ldots, P_N\}$, may be a second encoding of the pixel addresses to the projector columns of IR projector 152 equivalent to the first encoding of pixel addresses described in reference to action 612.

Processing may continue from action 614 to action 616: "Capture corresponding images of additional projected patterns $C_{(N+n)}$." At action 616, images of each projected pattern $P_{(N+n)}$ may be captured.

Processing may continue from action 616 to action 618: "Decode each pixel in $\{C_1, C_2, \ldots, C_N\}$." At action 618, images $\{C_1, C_2, \ldots, C_N\}$ may be decoded to produce a code word of N bits in length for each pixel. In various examples, the code word may correspond to a column of the projector encoded for the first set of projected images $\{P_1, P_2, \ldots, P_N\}$. Accordingly, a depth estimate of each pixel may be triangulated based on the known distance between the projector column and the camera and the camera ray-projector plane intersection for each pixel.

Processing may continue from action 618 to action 620: "Validate each pixel by supplanting one or more members of $\{C_1, C_2, \ldots, C_N\}$ with one or more corresponding additional patterns $C_{(N+n)}$ and decoding the new set." For example, $C_{11}$ may supplant $C_1$ to produce the modified set $\{C_{11}, C_2, \ldots, C_N\}$. The modified set may be decoded for each pixel to validate the previous column encoding for each pixel determined by decoding the initial set $\{C_1, C_2, \ldots, C_N\}$. It should be appreciated that multiple combinations of the additional patterns $C_{(N+n)}$ may be used to produce multiple validation sets. For k additional patterns $C_{(N+n)}$, $2^k$ validation sets may be generated. The number of validation sets used to validate the depth data may be adaptively determined based on an evaluation of an initial validation and/or based on depth estimation confidence values assigned to different contiguous regions of pixels based on initial validation using the techniques described herein.

Among other potential benefits, a system in accordance with the present disclosure may allow for self-validation of depth estimation using a time multiplexed structured light depth sensor. Advantageously, supplanting one or more binary patterns in a gray code or other encoding of a projector column allows an image processing system to validate the encoding while projecting and capturing as few as one additional image beyond the initial set of patterns used to estimate depth values in scene. Additionally, through the use of the self-validation techniques described herein, pixels with high confidence depth estimations may be masked out in further validation iterations to reduce the amount of unnecessary light on the scene and reduce error due to noise. Additionally, as described herein, each additional binary pattern projected (e.g., the inverse of one of the members of the set of gray code binary patterns used to provide the initial depth estimation) provides $2^k$ additional sets that may be used for self-validation. The number of self-validation iterations may be adaptively determined based on a percentage and/or number of pixels successfully validated (e.g., pixels with matching code words generated from different sets of projected patterns).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method for depth sensing, comprising:
   projecting, by an infrared projector, a first binary pattern onto an environment, wherein the first binary pattern comprises a first plurality of adjacent columns, wherein each column of the first plurality of adjacent columns is either illuminated with infrared light from the infrared projector or not illuminated with infrared light from the infrared projector;
   capturing, by an infrared sensor, a first image of the first binary pattern projected onto the environment;
   ceasing projection of the first binary pattern;
   projecting, by the infrared projector, a second binary pattern onto the environment wherein the second binary pattern comprises a second plurality of adjacent columns, wherein each column of the second plurality of adjacent columns is either illuminated with infrared light from the infrared projector or not illuminated with
infrared light from the infrared projector;
capturing, by the infrared sensor, a second image of the
second binary pattern projected onto the environment;
determining, by at least one processor, a first code word
for a first pixel address, wherein the first pixel address
is common to the first image and the second image, and
the first code word comprises a first pixel value of "1"
indicating that the first pixel address is illuminated in
the first image and a second pixel value of "0" indicating that the first pixel address is not illuminated in
the second image;
determining, by the at least one processor, that the first
code word corresponds to a first column of pixels on a
liquid crystal display (LCD) panel of the infrared
projector;
ceasing projection of the second binary pattern;
projecting, by the infrared projector, a third binary pattern
onto the environment, wherein the third binary pattern
comprises a third plurality of adjacent columns,
wherein each column of the third plurality of adjacent
columns is either illuminated with infrared light from
the infrared projector or not illuminated with infrared
light from the infrared projector, and wherein the third
binary pattern is an inverse of the first binary pattern
such that each illuminated column of the first binary
pattern corresponds to an unilluminated column of the
third binary pattern and each unilluminated column of
the first binary pattern corresponds to an illuminated
column of the third binary pattern;
capturing, by the infrared sensor, a third image of the third
binary pattern projected onto the environment;
determining, by the at least one processor, a second code
word for the first pixel address, wherein the first pixel
address is common to the first image, the second image,
and the third image, wherein the second code word
comprises a third pixel value of "0" indicating that the
first pixel address is not illuminated in the third image
and the second pixel value of "0" indicating that the
first pixel address is not illuminated in the second
image;
determining, by the at least one processor, that the second
code word corresponds to the first column of pixels on
the LCD panel of the infrared projector; and
determining, by the at least one processor, a first distance
between the first column of pixels on the panel of the
infrared projector and a first portion of the environment
represented by the first pixel address, wherein the first
distance is determined using a first position of the first
column and infrared light reflected from the first portion of the environment using a triangulation technique.

2. The method of claim 1, further comprising:
determining that the first distance is an estimated depth
value corresponding to the first pixel address;
ceasing projection of the third binary pattern;
projecting, by the infrared projector, a fourth binary
pattern onto the environment, wherein the fourth binary
pattern comprises a fourth plurality of adjacent columns, wherein each column of the fourth plurality of
adjacent columns is either illuminated with infrared
light from the infrared projector or not illuminated with
infrared light from the infrared projector, and wherein
the fourth binary pattern is an inverse of the second
binary pattern such that each illuminated column of the
second binary pattern corresponds to an unilluminated
column of the fourth binary pattern and each unilluminated column of the second binary pattern corresponds
to an illuminated column of the fourth binary pattern;
capturing, by the infrared sensor, a fourth image of the
fourth binary pattern projected onto the environment;
determining, by the at least one processor, a third code
word for the first pixel address, wherein the first pixel
address is common to the first, second, third, and fourth
images, wherein the third code word comprises the first
pixel value of "1" indicating that the first pixel address
is illuminated in the first image and a fourth pixel value
of "1" indicating that the first pixel address is illuminated in the fourth image;
determining, by the at least one processor, that the third
code word corresponds to a second column of pixels on
the LCD panel of the infrared projector different from
the first column; and
determining that the estimated depth value associated
with the first pixel address is incorrect.

3. The method of claim 1, further comprising:
ceasing projection of the third binary pattern;
determining that the first distance is an estimated depth
value corresponding to the first pixel address;
determining that the estimated depth value is validated
based on the first code word and the second code word
corresponding to the first column of pixels on the LCD
panel of the infrared projector; and
projecting, by the infrared projector, a fourth binary
pattern onto the environment, wherein a particular pixel
on the LCD panel of the infrared projector that corresponds to the first pixel address is turned off for
projection of the fourth binary pattern.

4. A method for depth sensing, comprising:
projecting, by a projector, a first pattern onto an environment;
capturing, by an image sensor, a first image of the first
pattern projected onto the environment;
projecting, by the projector, a second pattern onto the
environment;
capturing, by the image sensor, a second image of the
second pattern projected onto the environment;
determining, by at least one processor, a first code word
for a first pixel address, wherein the first pixel address
is common to the first image and the second image and
wherein the first code word comprises a first value of
the first pixel address in the first image and a second
value of the first pixel address in the second image;
determining, by the at least one processor that the first
code word corresponds to a first column of the projector;
projecting, by the projector, a third pattern onto the
environment;
capturing, by the image sensor, a third image of the third
pattern projected onto the environment;
determining, by the at least one processor, a second code
word for the first pixel address, wherein the first pixel
address is common to the first image, the second image
and the third image and wherein the second code word
comprises a third value of the first pixel address captured in the third image and the second value of the first
pixel address captured in the second image;
determining, by the at least one processor, that the second
code word corresponds to the first column of the
projector; and
assigning, by the at least one processor, a first confidence
value to a depth value associated with the first pixel address based at least in part on the first code word and the second code word corresponding to the first column of the projector.

5. The method of claim 4, further comprising:
determining that the first confidence value exceeds a threshold confidence value; and
determining that the depth value associated with the first pixel address has been validated.

6. The method of claim 5, further comprising:
determining that a first percentage of pixels in the first image have respective confidence values that are below the threshold confidence value;
determining that the first percentage of pixels in the first image is above a threshold percentage of the total number of pixels in the first image; and
projecting at least one additional pattern onto the environment.

7. The method of claim 5, further comprising triangulating a distance from the first column of the projector to a portion of the environment onto which light from the first pixel address is projected.

8. The method of claim 4 further comprising generating the third pattern by generating a binary inverse of the first pattern.

9. The method of claim 4, further comprising:
projecting, by the projector, a fourth pattern onto the environment, wherein the fourth pattern is a binary inverse of the second pattern;
capturing, by the image sensor, a fourth image of the fourth pattern projected onto the environment;
determining, by the at least one processor, a third code word for the first pixel address, wherein the first pixel address is common to the first image, the second image, the third image and the fourth image, wherein the third code word comprises a fourth value of the first pixel address in the fourth image and the first value of the first pixel address in the first image; and
determining, by the at least one processor, that the third code word corresponds to the first column.

10. The method of claim 9, further comprising:
determining, by the at least one processor, a fourth code word for the first pixel address wherein the fourth code word comprises the third value of the first pixel address in the third image and the fourth value of the first pixel address in the fourth image; and
determining, by the at least one processor, that the fourth code word corresponds to the first column.

11. The method of claim 4, further comprising:
projecting, by the projector, a fourth pattern onto the environment, wherein a pixel on an LCD panel of the projector that corresponds to the first pixel address is turned off for projection of the fourth pattern.

12. A depth sensor device, comprising:
at least one processor;
a projector configured to be in communication with the at least one processor;
an image sensor configured to be in communication with the at least one processor, the image sensor effective to detect light emitted into an environment by the projector; and
a non-transitory, computer-readable memory storing instructions that when executed by the at least one processor are effective to cause the depth sensor device to perform a method comprising:
projecting, by the projector, a first pattern onto the environment;
capturing, by the image sensor, a first image of the first pattern projected onto the environment;
projecting, by the projector, a second pattern onto the environment;
capturing, by the image sensor, a second image of the second pattern projected onto the environment;
determining, by the at least one processor, a first code word for a first pixel address, wherein the first pixel address is common to the first image and the second image and wherein the first code word comprises a first value of the first pixel address in the first image and a second value of the first pixel address in the second image;
determining, by the at least one processor, that the first code word corresponds to a first column of the projector;
projecting, by the projector, a third pattern onto the environment;
capturing, by the image sensor, a third image of the third pattern projected onto the environment;
determining, by the at least one processor, a second code word for the first pixel address, wherein the first pixel address is common to the first image, the second image and the third image and wherein the second code word comprises a third value of the first pixel address captured in the third image and the second value of the first pixel address captured in the second image;
determining, by the at least one processor, that the second code word corresponds to the first column of the projector; and
assigning, by the at least one processor, a first confidence value to a depth value associated with the first pixel address based at least in part on the first code word and the second code word corresponding to the first column of the projector.

13. The depth sensor device of claim 12, wherein the instructions when executed by the at least one processor are effective to cause the depth sensor device to perform the method further comprising:
determining that the first confidence value exceeds a threshold confidence value; and
determining that the depth value associated with the first pixel address has been validated.

14. The depth sensor device of claim 13, wherein the instructions when executed by the at least one processor are effective to cause the depth sensor device to perform the method further comprising:
determining that a first percentage of pixels in the first image have respective confidence values that are below a threshold confidence value;
determining that the first percentage of pixels in the first image is above a threshold percentage of the total number of pixels in the first image; and
projecting at least one additional pattern onto the environment.

15. The depth sensor device of claim 13, wherein the instructions when executed by the at least one processor are effective to cause the depth sensor device to perform the method further comprising triangulating a distance from the first column of the projector to a portion of the environment onto which light from the first pixel address is projected.

16. The depth sensor device of claim 12, wherein the instructions when executed by the at least one processor are effective to cause the depth sensor device to perform the method further comprising generating the third pattern by generating a binary inverse of the first pattern.

17. The depth sensor device of claim 12, wherein the instructions when executed by the at least one processor are effective to cause the depth sensor device to perform the method further comprising:
- projecting, by the projector, a fourth pattern onto the environment, wherein the fourth pattern is a binary inverse of the second pattern;
- capturing, by the image sensor, a fourth image of the fourth pattern projected onto the environment;
- determining, by the at least one processor, a third code word for the first pixel address, wherein the first pixel address is common to the first image, the second image, the third image and the fourth image, wherein the third code word comprises a fourth value of the first pixel address in the fourth image and the first value of the first pixel address in the first image, wherein the third code word is different from the first code word and the second code word; and
- determining, by the at least one processor, that the third code word corresponds to the first column.

18. The depth sensor device of claim 17, wherein the instructions when executed by the at least one processor are effective to cause the depth sensor device to perform the method further comprising:
- determining, by the at least one processor, a fourth code word for the first pixel address wherein the fourth code word comprises the third value of the first pixel address in the third image and the fourth value of the first pixel address in the fourth image; and
- determining, by the at least one processor that the fourth code word corresponds to the first column.

19. The depth sensor device of claim 12, wherein the instructions when executed by the at least one processor are effective to cause the depth sensor device to perform the method further comprising:
- projecting, by the projector, a fourth pattern on to the environment, wherein a pixel on an LCD panel of the projector that corresponds to the first pixel address is turned off for projection of the fourth pattern.

20. The depth sensor device of claim 12, wherein:
- the first value comprises a first bit of a gray code associated with a column of pixel addresses of the projector in a first encoding; and
- the second value comprises a second bit of the gray code associated with the column of pixel addresses of the projector in the first encoding.

* * * * *

UNITED STATES PATENT AND TRADEMARK OFFICE
CERTIFICATE OF CORRECTION

PATENT NO. : 10,282,857 B1
APPLICATION NO. : 15/634772
DATED : May 7, 2019
INVENTOR(S) : Ilya Vladimirovich Brailovskiy and Amit Kumar Agrawal Page 1 of 1

It is certified that error appears in the above-identified patent and that said Letters Patent is hereby corrected as shown below:

On the Title Page

At the end of the "U.S. PATENT DOCUMENTS" item "(56) References Cited", add the following references:
20170131090 A1 05/2017 Bronstein
20180020195 A1 01/2018 Lindner Signed and Sealed this
Seventeenth Day of September, 2019

Andrei Iancu
*Director of the United States Patent and Trademark Office*